(12) United States Patent
Hood et al.

(10) Patent No.: US 7,785,034 B2
(45) Date of Patent: Aug. 31, 2010

(54) DESEGREGATION SYSTEM

(75) Inventors: William A. Hood, Reasnor, IA (US); Tate Huizer, Pella, IA (US)

(73) Assignee: Weiler, Inc., Knoxville, IA (US)

( * ) Notice: Subject to any disclaimer, the term of this patent is extended or adjusted under 35 U.S.C. 154(b) by 0 days.

(21) Appl. No.: 12/146,540

(22) Filed: Jun. 26, 2008

(65) Prior Publication Data
US 2009/0324332 A1    Dec. 31, 2009

(51) Int. Cl.
*E01C 19/22* (2006.01)
*E01C 19/38* (2006.01)

(52) U.S. Cl. ...................... 404/112; 404/113

(58) Field of Classification Search .......... 404/94, 404/112, 113
See application file for complete search history.

(56) References Cited

U.S. PATENT DOCUMENTS

| | | | | |
|---|---|---|---|---|
| 955,077 | A | * | 4/1910 | Janney ................. 210/523 |
| 2,991,895 | A | | 7/1961 | Dietzenbach |
| 3,301,151 | A | * | 1/1967 | Hanson et al. ............ 404/105 |
| 3,967,912 | A | * | 7/1976 | Parker ..................... 404/84.05 |
| 4,072,435 | A | | 2/1978 | Coho et al. |
| 4,310,252 | A | * | 1/1982 | Ryan ....................... 366/186 |
| 4,473,320 | A | | 9/1984 | Register |
| 4,664,583 | A | | 5/1987 | Gust |
| 4,688,965 | A | | 8/1987 | Smith et al. |
| 4,772,156 | A | | 9/1988 | Craig |
| 4,818,139 | A | | 4/1989 | Brock et al. |
| 4,823,366 | A | | 4/1989 | Williams |
| 4,933,853 | A | | 6/1990 | Musil et al. |
| 4,946,283 | A | | 8/1990 | Musil |
| 5,002,398 | A | | 3/1991 | Musil |
| 5,002,426 | A | | 3/1991 | Brown et al. |
| 5,015,120 | A | | 5/1991 | Brock et al. |
| 5,033,863 | A | | 7/1991 | Linkletter |
| 5,035,534 | A | | 7/1991 | Brock et al. |
| 5,044,819 | A | * | 9/1991 | Kilheffer et al. ............. 404/72 |
| 5,073,063 | A | | 12/1991 | Brown |
| 5,100,277 | A | | 3/1992 | Musil et al. |
| 5,197,848 | A | | 3/1993 | Musil et al. |
| 5,199,638 | A | * | 4/1993 | Fischer ....................... 239/7 |
| 5,201,604 | A | * | 4/1993 | Ferguson et al. ............ 404/110 |
| 5,263,806 | A | | 11/1993 | Elkin et al. |
| 5,344,254 | A | | 9/1994 | Sartain |
| 5,356,238 | A | | 10/1994 | Musil et al. |
| 5,362,177 | A | | 11/1994 | Bowhall et al. |
| 5,401,115 | A | | 3/1995 | Musil et al. |
| 5,405,214 | A | | 4/1995 | Campbell |

(Continued)

*Primary Examiner*—Thomas B Will
*Assistant Examiner*—Abigail A Risic
(74) *Attorney, Agent, or Firm*—G. Brian Pingel; Camille L. Urban

(57) ABSTRACT

A desegregation system for use with hot mix asphalt, warm mix or with any material that will flow and which includes pieces of material of various sizes and for which uniform mixture is important. The system is substantially within a hopper having a material inlet and a material outlet and includes an auger section having a plurality of flights near a first end of an auger shaft and another, counter-handed section near the other end of the auger shaft. The system preferably has a parallel, interlaced pair of right handed auger sections mounted near corresponding ends of separate shafts and a second pair of parallel interlaced auger sections, left-handed, mounted near the opposite and corresponding ends of separate shafts.

7 Claims, 7 Drawing Sheets

U.S. PATENT DOCUMENTS

| | | | |
|---|---|---|---|
| 5,443,325 A | 8/1995 | Simonelli et al. | |
| 5,479,728 A * | 1/1996 | Deken et al. | 37/142.5 |
| 5,529,434 A * | 6/1996 | Swisher, Jr. | 404/108 |
| 5,531,542 A | 7/1996 | Willis | |
| 5,533,829 A | 7/1996 | Campbell | |
| 5,549,412 A | 8/1996 | Malone | |
| 5,549,414 A * | 8/1996 | Boxall et al. | 404/101 |
| 5,553,968 A | 9/1996 | Campbell | |
| 5,553,969 A * | 9/1996 | Reed | 404/110 |
| 5,622,323 A * | 4/1997 | Krueger et al. | 241/101.76 |
| 5,642,961 A | 7/1997 | Campbell | |
| 5,752,783 A | 5/1998 | Malone | |
| 5,863,149 A * | 1/1999 | Gustin | 404/104 |
| 5,868,522 A | 2/1999 | Campbell | |
| 5,899,630 A | 5/1999 | Brock | |
| 5,924,818 A | 7/1999 | Holmes | |
| 5,980,153 A | 11/1999 | Plemons et al. | |
| 6,000,649 A * | 12/1999 | Loppoli | 241/260.1 |
| 6,007,272 A | 12/1999 | Macku et al. | |
| 6,019,544 A | 2/2000 | Emerson et al. | |
| 6,030,058 A | 2/2000 | Snyder et al. | |
| 6,099,205 A | 8/2000 | Macku et al. | |
| 6,106,192 A | 8/2000 | Hargis et al. | |
| 6,123,399 A | 9/2000 | Snyder | |
| 6,135,671 A | 10/2000 | Yasu et al. | |
| 6,152,649 A | 11/2000 | Snyder et al. | |
| 6,273,636 B1 | 8/2001 | Johanpeter | |
| 6,318,928 B1 | 11/2001 | Swearingen | |
| 6,390,283 B1 | 5/2002 | Goodwin | |
| 6,398,453 B1 * | 6/2002 | Stegemoeller | 404/108 |
| 6,551,018 B2 | 4/2003 | Baker et al. | |
| 6,551,021 B2 | 4/2003 | Baker | |
| 6,688,450 B2 | 2/2004 | Speers et al. | |
| 6,749,364 B1 | 6/2004 | Baker et al. | |
| 6,776,557 B2 | 8/2004 | Barnat et al. | |
| 6,802,667 B2 | 10/2004 | Baker | |
| 6,832,872 B2 | 12/2004 | Koelm et al. | |
| 7,121,636 B2 | 10/2006 | Blank et al. | |
| 7,121,763 B1 | 10/2006 | Young et al. | |
| 7,160,056 B1 | 1/2007 | Hoffmann et al. | |
| 7,258,294 B1 * | 8/2007 | Ralicki | 241/260.1 |
| 7,261,491 B2 | 8/2007 | Rahn et al. | |
| 7,316,522 B2 * | 1/2008 | Guntert et al. | 404/108 |
| 2002/0154949 A1 * | 10/2002 | Boyd | 404/92 |
| 2003/0143024 A1 * | 7/2003 | Sharpe et al. | 404/75 |
| 2003/0215288 A1 * | 11/2003 | Causie et al. | 404/104 |
| 2004/0208699 A1 * | 10/2004 | Grubba | 404/84.1 |
| 2005/0058507 A1 | 3/2005 | Musil et al. | |
| 2005/0074284 A1 * | 4/2005 | Lee et al. | 404/108 |
| 2006/0204333 A1 | 9/2006 | Musil | |
| 2007/0065230 A1 | 3/2007 | Musil et al. | |

\* cited by examiner

DESEGREGATION SYSTEM

BACKGROUND OF THE INVENTION

1. Field of the Invention

The present invention relates generally to delivery of hot mix asphalt for road bed construction and more particularly to an assembly and method for insuring desegregation of the hot or warm mix asphalt prior to its application to the road bed.

2. Description of the Prior Art

Hot mix asphalt (HMA) is typically prepared off-site from the road bed being constructed. It is then transferred to a transport machine which may be a dump truck and then either to a material transport vehicle or directly to a paving machine. In any case, the HMA is often elevator conveyed to a spout from which it falls into the truck bed. Next, it exits a chute at the back of the truck usually into some sort of hopper. From there it is conveyed and falls from the conveyor either directly into a paving apparatus from which it exits onto the road bed or into another hopper where it is temporarily stored until a paving machine is ready to use it. The HMA is between 300 and 450 degrees Fahrenheit.

Through the transport process more and more larger heavier pieces of HMA roll to the outside of any pile or peak of HMA. The material also has a temperature variation because the material on the outside of the truck cools faster then the material in the middle of the truck. Due to this segregation, roadbeds constructed will not be uniform and their durability will be severely reduced. Because each transport step allows this gravity-effected segregation of the HMA to occur, a number of devices have been derived which operate to desegregate the HMA prior to its roadbed application, however, these prior devices although an improvement over gravity alone, still do not create the uniform HMA distribution that is desired.

U.S. Pat. No. 5,405,214 for a Paving Machine Incorporating Automatic Feeder Control Gates uses a first gate mechanism and a second gate mechanism. Raising one and lowering the other shifts discharged materials to one side; raising and lowering the opposite shifts the material to the other allowing management of the flow along both a vertical and horizontal plane. Some mixing also occurs as a result.

U.S. Pat. No. 5,553,968 for a Method and Apparatus for Conveying and Desegregating Aggregate uses a different approach. Rather than using adjustable gates to move outer materials to the center for remixing, this one uses a notch in the floor of a first drag slat conveyor. The notch is in the center of the first conveyor floor and positioned near the end of the first conveyance path. The small pieces fall through the notch on to a second conveyor, the large pieces fall later thereby re-orienting the small and large pieces along the direction of the conveyor, rather than outside to inside.

U.S. Pat. No. 5,642,961 for a Method for Conveying and Desegregating Aggregate is similar to the U.S. Pat. No. 5,553,968 in that it reorients laterally segregated aggregate on a conveyor to a longitudinally segregated aggregate. The aggregate is then desegregated as it comes into contact with and travels along a second conveyor. This is achieved by discharging smaller pieces onto the second conveyor before the larger.

In U.S. Pat. No. 6,007,272 for an Asphalt Paver with Remixing Conveyor System a paver which includes a hopper conveyor to move HMA from hopper to screed is disclosed as having at least one pair of spaced apart axially rotatable augers. These augers are disposed in the direction of travel. Each auger has a "tapered peripheral diameter" defining a space therebetween as a "remixing zone".

U.S. Pat. No. 6,481,922 to Boyd specifically teaches a device wherein the outer portions of a moving HMA stream are moved toward the center via augers. Here, the outer portions of the HMA stream drops through a material outlet with the inner portions of the stream. This patent terms the uncovered center portion of the augers which is positioned directly over the material outlet a mixing zone disclosing that this is the area where mixing the small and large pieces of HMA occurs. In truth, very little mixing occurs but, rather, the outer and inner portions of the stream are simply concentrated to fall together through a smaller opening. While this necessarily does result in some remixing of some pieces of HMA, this device does not adequately address the need for a uniform HMA mixture.

Finally, U.S. Pat. No. 5,035,534 includes transversely disposed variable pitch screw augers on a single shaft mounted in the bottom of storage hopper. The first screw auger is located on one side of a mid portion of the shaft and the second is located on the other side of a mid portion of the shaft. Each of the screw augers has flights of a first pitch at the outer end of the shaft and flights of a second pitch set inwardly. This arrangement is disclosed as allowing the HMA at the center portion of stream to combine with material transported inwardly to center. The disclosure states that the variable pitches allow different sizes of HMA pieces to be mixed and specifically discloses that the mixing occurs due to and in the flights of the pitched augers. The material is mixed in the flights and moved toward the center where it falls through the material outlet underneath a cover.

It is a first object of the present invention to create a desegregation system that improves the desegregation of the HMA over previous inventions;

It is a second object of the present invention to create an augering system that more completely mixes HMA within and between its auger flights;

It is a third object of the present invention to devise means to better divert the small pieces of HMA from a midportion of the conveyed stream of HMA to the outer portions of the stream;

It is a fourth object of the present invention to create a way for the diverted HMA to be more completely blended with all portions of the HMA which is not diverted;

It is a fifth object of the present invention to provide an output stream of HMA that has a flatter profile rather than highly peaked in the middle.

SUMMARY OF THE INVENTION

The present invention is a desegregation system. The desegregation system may be employed with hot mix asphalt, warm mix or with any material that will flow and which includes pieces of material of various sizes. It may be employed in the paving process or used with other processors where uniform mixture is important. The system is substantially within a hopper having a material inlet and a material outlet.

The basic structure of the system includes an auger section having a plurality of flights near a first end of an auger shaft and another, counter-handed section near the other end of the auger shaft. Another embodiment includes a parallel pair of right handed auger sections, each having a plurality of flights, mounted near corresponding ends of separate shafts and a second pair of parallel auger sections, left-handed, mounted near the opposite and corresponding ends of separate shafts. In the preferred embodiment, the desegation system has a parallel, interlaced pair of right handed auger sections mounted near corresponding ends of separate shafts and a second pair of parallel interlaced auger sections, left-handed, mounted near the opposite and corresponding ends of separate shafts. The interlaced auger flights provide a more thorough mixing of the HMA than a single auger section or even of parallel auger sections. The two sections of augers or the two pairs of auger sections are separated by the mid-portions of the auger shafts. The mid-portions of the auger shafts are positioned over the material outlet.

Some hoppers are designed to include more than one material outlet. In this way, the HMA is discharged in two parallel streams which creates a flatter profile of the entire stream and further improves the desegregation upon the road bed. To achieve this, additional pairs of augers may be employed, each separated from a counter-handed pair by mid-portions of the respective augers. These mid-portions are positioned generally over one of the material outlets.

In addition to the augers, the desegregation system employs a diverter. The diverter is placed over the mid portions of the auger shafts and acts to divert the small HMA pieces from the middle of the HMA stream over to one of the augers or pairs of augers where it is mixed with the larger pieces and subsequently moved back under the diverter to fall through the material outlet. The diverter is shaped so that its middle portion is raised toward the material inlet and its outer portions are lower thereby directing the HMA pieces toward the ends of the auger shafts. In the preferred embodiment, the middle portion of the diverter culminates in a raised ridge forming a tent-like structure and the outer portions include at least one cut out area which allows the HMA to be mixed more before moving all the way under the diverter and results in moving some of the HMA through to the other auger or pair of augers for additional mixing.

The key to effectively operating the desegregation system for maximum effect is to run the augers and outbound conveyor at speeds that do not allow HMA to cover the augers completely. Adequate mixing cannot be achieved when HMA fills the auger flights completely or covers the augers. Rather the desegregation system's optimal mixing occurs when at least some portion of the augers are not filled with HMA thereby allowing adequate room for HMA pieces to move relative to each other and in response to the auger and movement. In prior augering systems the auger has been completely full of material which gives the material no open space to actually remix. The speed of rotation and size of the augers, the rate of flow of the mixture and the level of mixture within the augers of the present invention is critical for optimal desegregation. The present invention comprises allowing a rate of flow of the mixture so that only the bottom 1/3 of the augers are moving material, the remainder are open allowing for the material to have an area to remix.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DETAILED DESCRIPTION OF THE PREFERRED AND OTHER EMBODIMENTS

Figure 1:
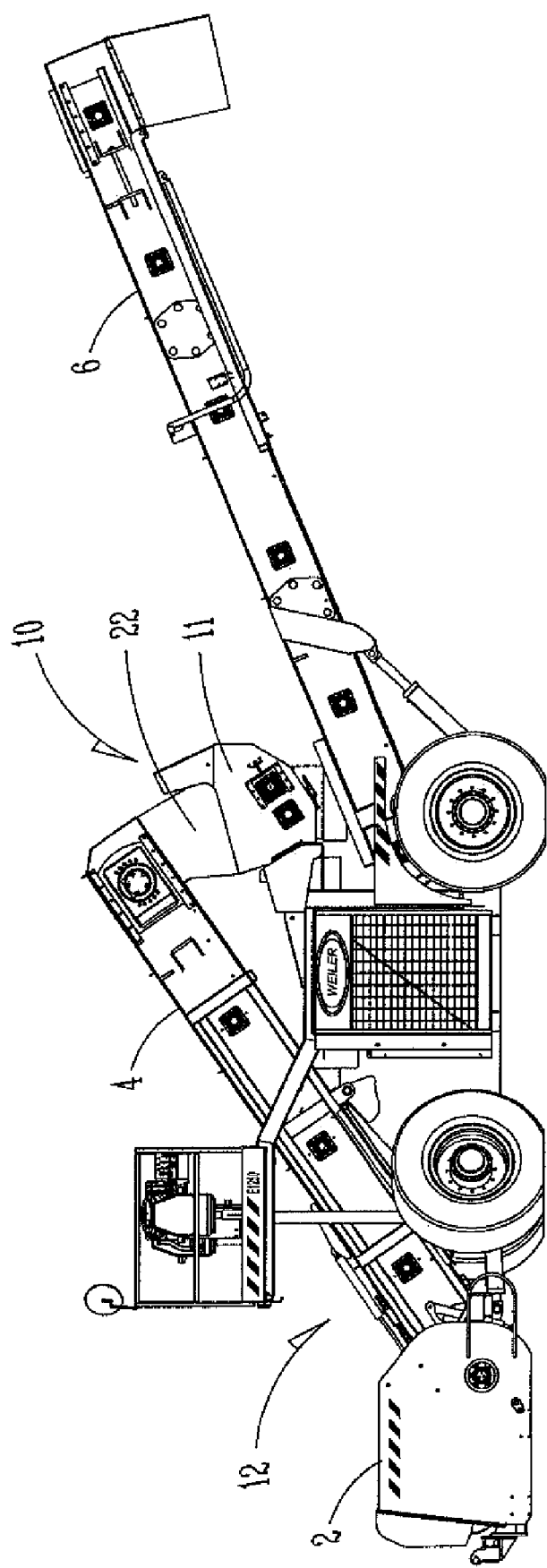
FIG. 1 is right front perspective view showing a HMA transport device utilizing the desegregation system of the present invention.
Figure 2:
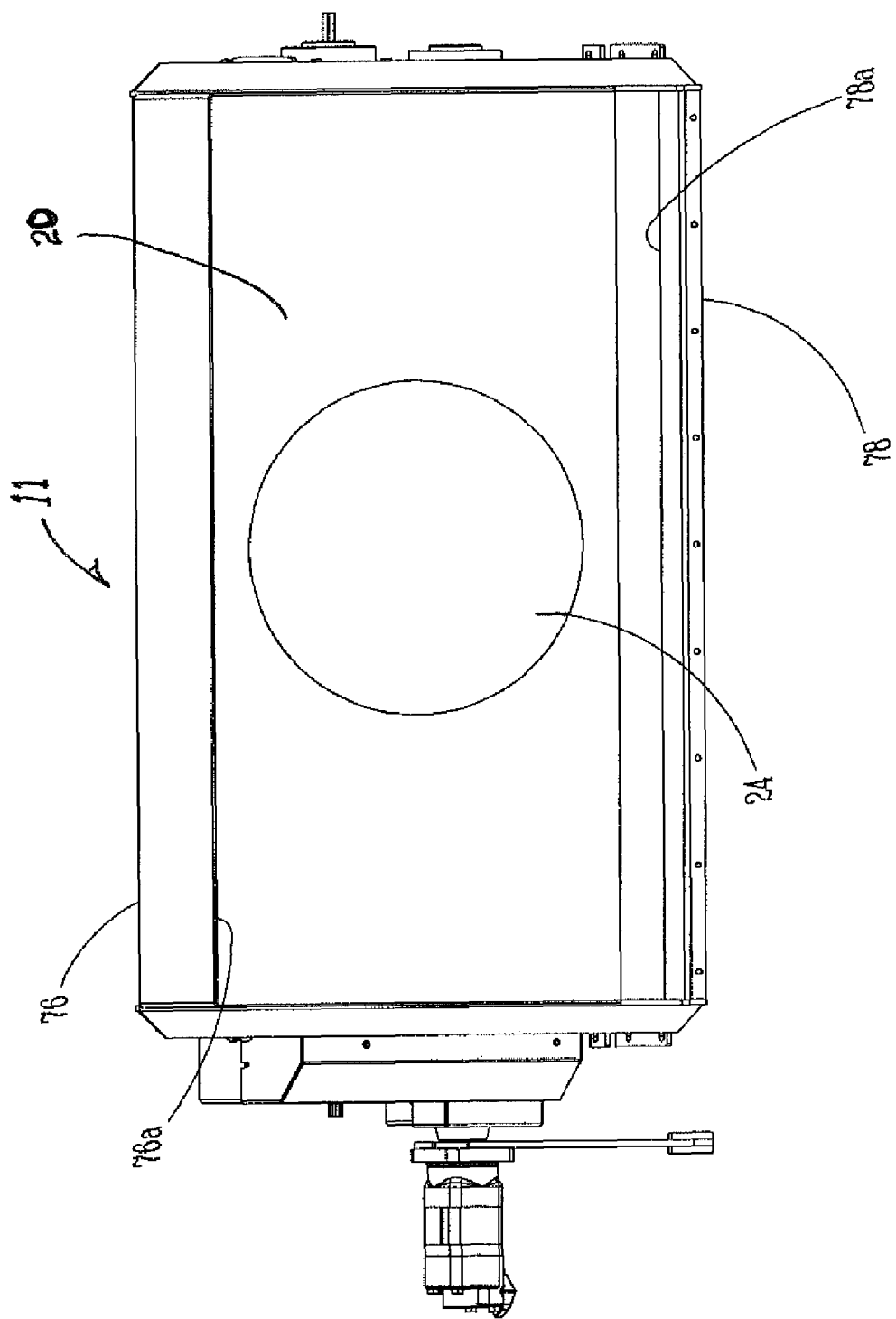
FIG. 2 is a top plan view into the hopper of the preferred embodiment without means for augering or means for diverting.
Figure 2A:
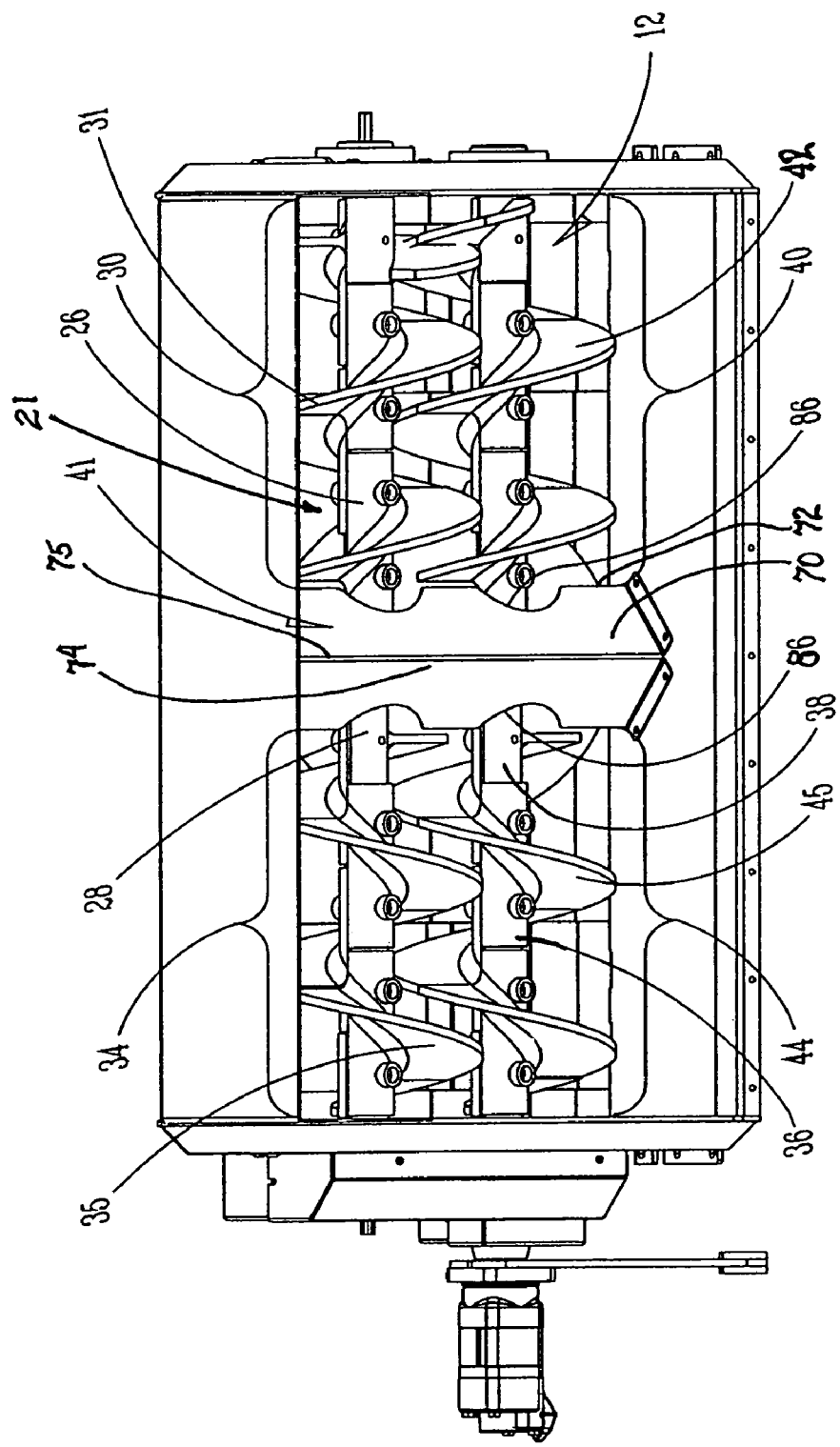
FIG. 2A is a top plan view into the hopper of the preferred embodiment showing the details of means for augering.
Figure 2B:
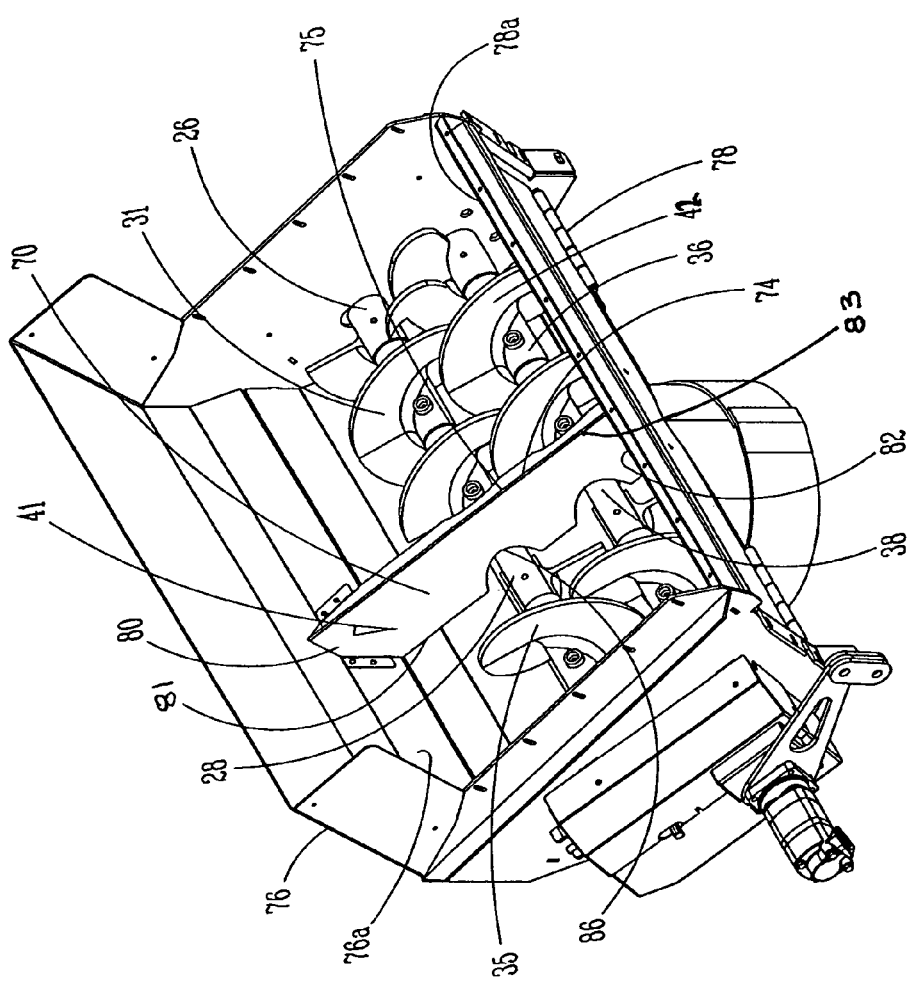
FIG. 2B is a perspective view into the hopper of the preferred embodiment showing the details of means for diverting HMA.
Figure 3:
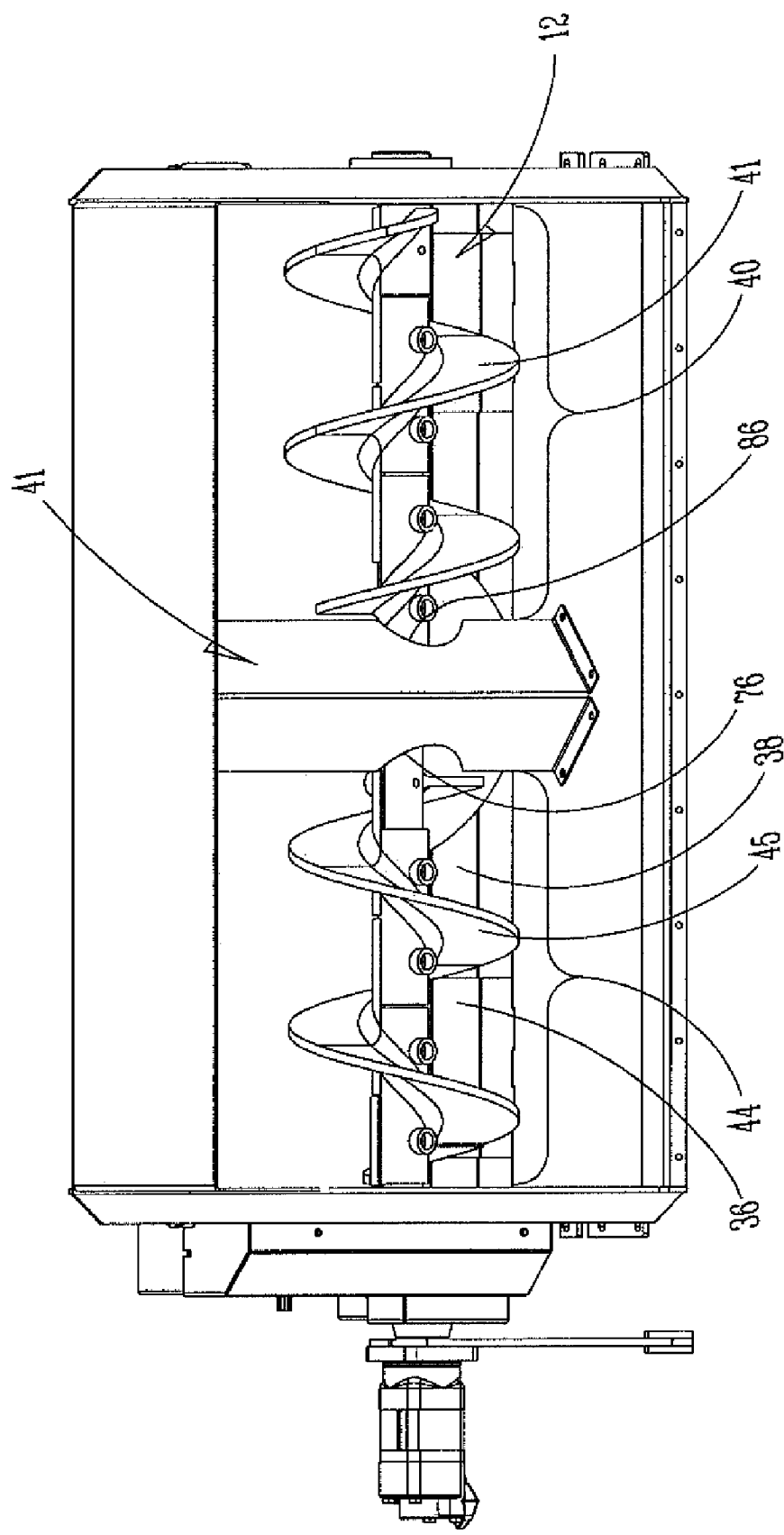
FIG. 3 is a top plan view into the hopper of a second embodiment.
Figure 4:
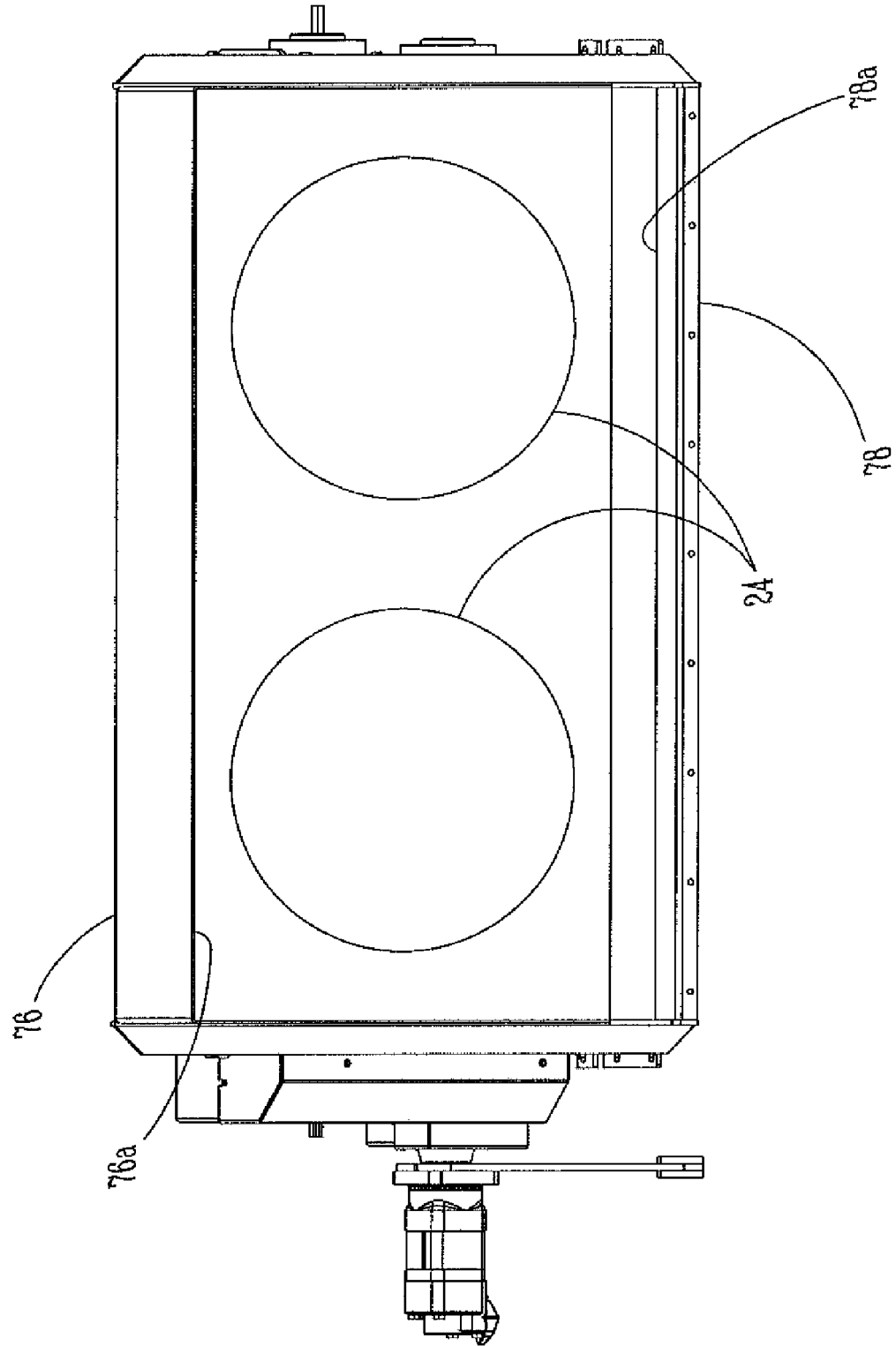
FIG. 4 is a top plan view into the hopper of a third embodiment without means for augering or means for diverting.
Figure 5:
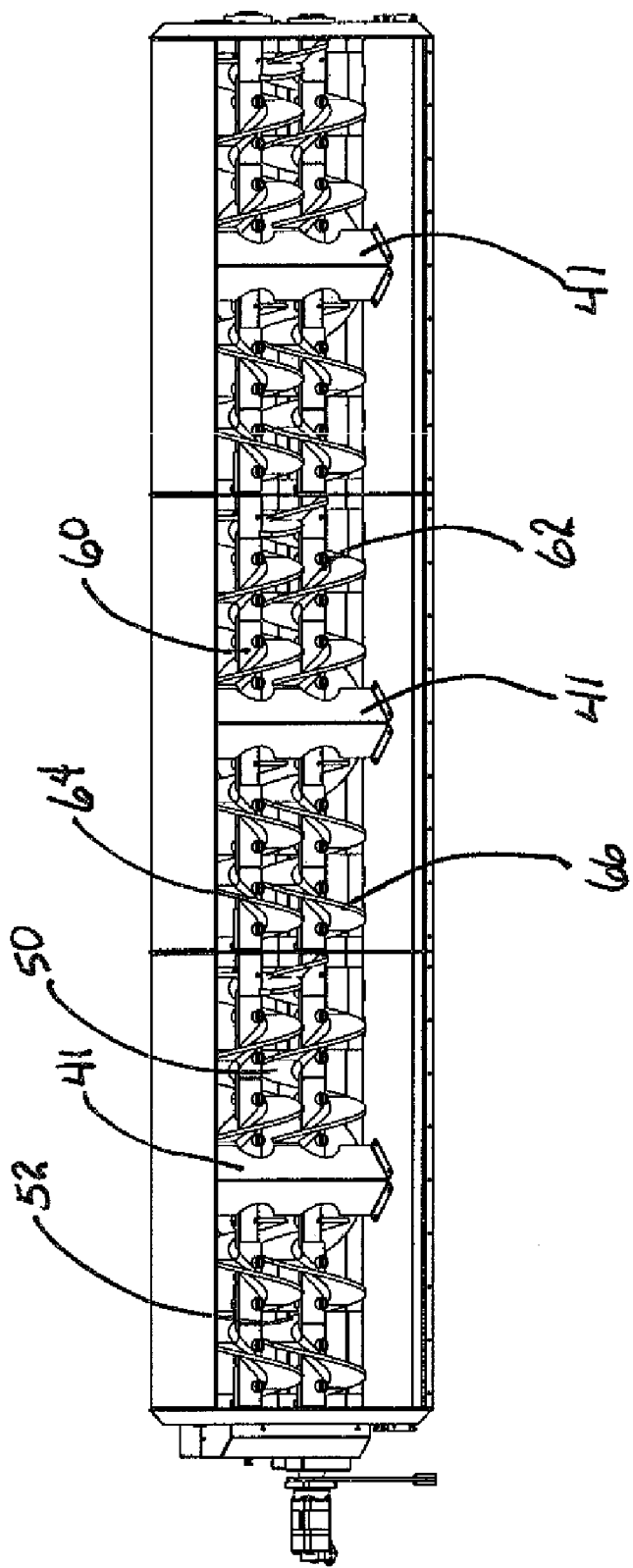
FIG. 5 is a top plan view into the hopper of the third embodiment showing the details of means for augering.

Turning now to FIG. 1, the desegregation system 10 of the present invention is shown with a material transfer vehicle 12 used to transport HMA. The material transfer vehicle 12 includes a dump hopper 2, an elevating conveyor 4, and a transfer conveyor 6. The desegregation system 10 is positioned substantially inside a hopper 11 and accepts HMA from the elevator conveyor 4 and provides HMA to the transfer conveyor 6 which transports the HMA to a hopper on a paving machine (not pictured). It should be noted that the desegregation system 10 could be equally employed by a paving machine having a hopper.

The hopper 11 comprises a bottom surface 20, at least one material inlet 22 through which hot mix asphalt enters, and at least one material outlet 24 through said bottom surface 20. When employed by a material transfer vehicle 12, the HMA is typically conveyed to the at least one material inlet 22 by the elevator conveyor 4. It passes through the desegregation system 10 and then through said at least one material outlet 24.

The desegregation system 10 is located generally between said at least one material inlet 22 and said at least one material outlet 24 and comprises means for augering 21 and means for diverting 41. In one embodiment, said means for augering 21 comprises at least one auger shaft 26 having at least one mid-portion 28 preferably positioned above said material outlet 24, at least one right-handed auger section 30 having a plurality of flights 31, and at least one left-handed auger section 34 having a plurality of flights 35.

In a preferred embodiment, said means for augering 21 further comprises a second auger shaft 36 having at least one mid-portion 38, at least one right-handed auger section 40 having a plurality of flights 42, and at least one left-handed auger section 44 having a plurality of flights 45 whereas said right-handed auger sections 30 and 40 form a first pair of auger sections 50 and said left-handed auger sections 34 and 44 form a second pair of auger sections 52. Preferably in this embodiment the first shaft 26 and second shaft 36 are arranged generally parallel in said hopper 11 and said pluralities of flights 31 and 42 are interlaced as are said pluralities of flights 35 and 45. Further, said mid portion 38 and said mid portion 28 are positioned above said at least one material outlet 24.

In yet a third embodiment, said means for augering 21 further comprises more than two pairs of auger sections 30, 40 and 34, 44 and 60, 62 and 64, 66 wherein said pluralities of flights for each pair are preferably interlaced. In this embodiment said first auger shaft 26 includes at least two mid portions 28 and said second auger shaft 36 includes at least two mid portions 38 and each pair of auger sections is separated from another pair of auger sections by at least one mid portion 28 and at least one mid portion 38. As in the other embodiments, each of said at least one mid portion 28 and 38 are generally positioned above one of said at least one material outlet 24.

Said means for diverting 41 comprises at least one diverter 70. In the preferred embodiment, each of said at least one diverter 70 is positioned generally above said at least one mid portion 28 and 38 and below said material inlet 22. Said means for diverting comprises an outer boundary 72 and a midsection 74. In the preferred embodiment, the hopper 11 further comprises side panels 76, 78 each having an inside surface 76a and 78a, respectively and the diverter 70 has a tent-like structure wherein said midsection 74 comprises a ridge 75 and said outer boundary 72 is generally rectangular having four sides 80-83 with side 80 adjacent said inside surface 76a and side 82 adjacent said inside surface 78a.

The diverter 70 of the preferred embodiment further comprises at least one cut-out area 86. The cut-out area 86 is positioned over both or either said first auger shaft or said second auger shaft near said mid portions of said first and second shafts. The cut-out area 86 allows HMA to be mixed more prior to going under the diverter 70, positions the diverter 70 to block amalgamated chunks so they can be desegregated again, and allows some of the HMA to proceed under the diverter 70 and into the pair of augers on the other side of the diverter for further mixing.

The method for optimally desegregated a non-uniform mixture comprises employing the desegregation system of the present invention, and adjusting the rate of flow into the system and the speed of the means to auger such that ¼ to ½; and preferably only about ⅓ of the volume of space between the flights of the auger sections is filled at any given time of the mixture and specifically avoiding a level of mixture wherein the auger flights are covered by the nonuniform mixture. Thus, the present invention has been described in an illustrative manner. It is to be understood that the terminology that has been used is intended to be in the nature of words of description rather than of limitation.

Many modifications and variations of the present invention are possible in light of the above teachings. For example, a single auger shaft with a right handed auger on one end and a left on the other may be employed or two parallel shafts each having several auger sections of alternating handedness may be employed. The flights may be interlaced or not. The diverter might be of a variety of constructions as long as it diverts HMA into the auger flights. The vehicle may include any vehicle that transports HMA or applies HMA to a surface. It is even conceivable that employing a different conveying device beneath the diverter may also be workable. Therefore, within the scope of the appended claims, the present invention may be practiced otherwise than as specifically described.

We claim:

1. A device for desegregating a hot mix asphalt mixture said device comprising:
   a) a hopper with an open top that serves as a material inlet through which said hot mix asphalt mixture enters, and a bottom surface with a material outlet through which said mixture exits;
   b) a desegregation system positioned substantially within said hopper comprising means for augering said mixture and means for diverting said mixture;
   c) means for transporting said mixture to said material inlet;
   d) said means for augering comprises a first auger shaft having a mid portion, a second auger shaft having a mid portion, said first and second auger shafts positioned generally parallel in said hopper beneath said open top, at least one right handed auger flight mounted on one end of said first auger shaft and at least one right handed auger flight mounted on one end of said second auger shaft forming a first pair of augers;
   e) said means for augering further comprising at least one left handed auger flight mounted on an opposite end of said first auger shaft and at least one left handed auger flight mounted on said opposite end of said second auger shaft forming a second pair of augers wherein said first pair of augers and said second pair of augers are spaced apart by said mid portion of said first shaft and said mid portion of said second shaft;
   f) one of said first pair of augers or said second pair of augers comprises at least two closely interlaced flights; and
   g) said means for diverting comprising a diverter positioned generally between said material inlet and said material outlet and positioned perpendicular to said augering means to overlie said mid portion of said first auger shaft and said mid portion of said second auger shaft, said diverter comprising a tent shaped structure with slanted sides and a raised midsection whereby said material inlet is positioned closer to said midsection of said diverter than to the outer boundaries of said slanted sides for diverting said mixture toward said means for augering.

2. The device as claimed in claim 1, wherein said diverter comprises outer boundaries and a midsection, said outer boundaries spaced on opposite sides of said midsection and further from said material inlet than said midsection.

3. The device as claimed in claim 2, wherein said midsection of said diverter comprises a ridge oriented generally perpendicular to the axes of said first auger shaft and said second auger shaft.

4. The device as claimed in claim 3, wherein said outer boundaries of said diverter comprise at least two edges and said diverter further comprises at least one cut out in at least one of said two edges through which at least one of said augers moves said desegregated mixture.

5. The device as claimed in claim 3, wherein said diverter further comprises at least one cut out area on said outer boundary through which at least one auger moves desegregated hot mix asphalt.

6. The device as claimed in claim 3, wherein said diverter further comprises at least one cut out area on said outer boundary, each said cut out area vertically positioned between said material inlet and one of said first auger shaft and said second auger shaft.

7. A device for desegregating a hot mix asphalt mixture said device comprising:
   a) a hopper with an open top that serves as a material inlet through which said hot mix asphalt mixture enters, and a bottom surface with a material outlet through which said mixture exits;
   b) a desegregation system positioned substantially within said hopper comprising means for augering said mixture and means for diverting said mixture;
   c) means for transporting said mixture to said material inlet;
   d) said means for augering comprises a first auger shaft having a mid portion, a second auger shaft having a mid portion, said first and second auger shafts positioned generally parallel in said hopper beneath said open top, at least one right handed auger flight mounted on one end of said first auger shaft and at least one right handed auger flight mounted on one end of said second auger shaft forming a first pair of augers;

e) said means for augering further comprising at least one left handed auger flight mounted on an opposite end of said first auger shaft and at least one left handed auger flight mounted on said opposite end of said second auger shaft forming a second pair of augers wherein said first pair of augers and said second pair of augers are spaced apart by said mid portion of said first shaft and said mid portion of said second shaft;
f) said first pair of augers comprises at least two interlaced flights, and said second pair of augers comprises at least two closely interlaced flights; and
g) said means for diverting comprising a diverter positioned generally between said material inlet and said material outlet and positioned perpendicular to said augering means to overlie said mid portion of said first auger shaft and said mid portion of said second auger shaft, said diverter comprising a tent shaped structure with slanted sides and a raised midsection whereby said material inlet is positioned closer to said midsection of said diverter than to the outer boundaries of said slanted sides for diverting said mixture toward said means for augering.

* * * * *